United States Patent [19]

Denda et al.

[11] Patent Number: 4,981,047
[45] Date of Patent: Jan. 1, 1991

[54] CONTROL UNIT FOR A CONSTRUCTION MACHINE

[75] Inventors: Rinta Denda, Nagano; Masaharu Nishimoto, Hiroshima; Hidetomo Kasa, Hiroshima; Kazuyuki Doi, Hiroshima, all of Japan

[73] Assignee: Kabushiki Kaisha Kobe Seiko Sho, Kobe, Japan

[21] Appl. No.: 443,472

[22] Filed: Nov. 30, 1989

[30] Foreign Application Priority Data

Dec. 20, 1988 [JP] Japan .................. 63-165557[U]

[51] Int. Cl.⁵ .................................... G05G 9/047
[52] U.S. Cl. ........................... 74/471 XY; 74/524; 74/525; 137/270; 137/636.2; 403/84; 403/341; 403/361
[58] Field of Search ............... 74/471 XY, 524, 525; 137/270, 636.2; 403/84, 341, 361

[56] References Cited

U.S. PATENT DOCUMENTS

| | | | |
|---|---|---|---|
| 3,707,093 | 12/1972 | Worden | 74/471 XY |
| 4,098,286 | 7/1978 | Prime | 137/636.2 X |
| 4,187,737 | 2/1980 | Mori et al. | 137/636.2 X |
| 4,397,336 | 8/1983 | Godfrey | 137/636.2 |
| 4,646,778 | 3/1987 | Tsuji et al. | 137/636.2 X |

FOREIGN PATENT DOCUMENTS 2449924 9/1980 France .
60-102435 6/1985 Japan .
531749 1/1973 Switzerland .

*Primary Examiner*—Allan D. Herrmann
*Attorney, Agent, or Firm*—Oblon, Spivak, McClelland, Maier & Neustadt

[57] ABSTRACT

A control unit for controlling the hydraulic system of a construction machine, such as a hydraulic shovel, having a structure capable of being simply and quickly changed from one setup for another setup suitable for a desired mode of control operation. The control unit comprises a control lever pivotally supported for movement in longitudinal and transverse directions, and first and second link rods for transmitting the operating force of the control lever to first and second hydraulic control valves when the control lever is shifted in the longitudinal and transverse directions, respectively. An operating force transmitting member is put on the control lever so as to be rotatable about the axis of the control lever, and a locking member is mounted on the control lever so as to be slidable along the axis of the control lever and so as to be unable to rotate relative to the control lever. In changing the setup of the control unit, the locking member is disengaged from the operating power transmitting member, the operating power transmitting member is turned through an angle of 90°, and then the locking member is brought into engagement with the operating force transmitting member to lock the operating force transmitting lever in place relative to the control lever.

2 Claims, 5 Drawing Sheets

CONTROL UNIT FOR A CONSTRUCTION MACHINE

BACKGROUND OF THE INVENTION

1. Field of the Invention

The present invention relates to a control unit for a construction machine, for controlling the operation of the working units of the construction machine, such as a hydraulic shovel.

2. Description of the Related Art

As is generally known, a hydraulic shovel, for example, is provided with a control unit having a single control lever pivotally supported for pivotal movement in longitudinal and transverse directions to facilitate the control of the working units of the hydraulic shovel. The control lever is shifted in logitudinal directions, namely, forward and backward directions, to control the arm and in transverse directions, namely, rightward and leftward directions, to control the bucket.

Such a known control unit will be described with reference to FIGS. 5 and 6. A control lever 1 is supported on a fixed lever stand, not shown, by a universal coupling mechanism 2 for pivotal movement in longitudinal and transverse directions. A bracket 3 is fastened to the lower end of the control lever 1 with a nut 4 pressing the bracket 3 against the lower end of the control lever 1 so as to pivot integrally with the control lever 1. When the nut 4 is loosened, the bracket 3 is allowed to turn about the axis of the control lever 1. The upper end of a first link rod 6 for operating a first hydraulic control valve 5 for controlling the operation of a first hydraulic cylinder actuator, for example, for operating the arm of a hydraulic shovel, and the upper end of a second link rod 8 for operating a second hydraulic control valve 7 for controlling the operation of a second hydraulic cylinder actuator, for example, for operating the bucket of the hydraulic shovel are joined to the bracket 3 respectively at positions spaced apart at an angular interval of 90° in the circumferential direction. Only the first link rod 6 is pulled or pushed when the control lever 1 is shifted forward or backward to operate the first hydraulic control valve 5. Only the second link rod 8 is pulled or pushed when the control lever 1 is shifted rightward or leftward to operate the second hydraulic control valve 7.

In some cases, it is desired to change the setup of the control unit to change the mode of control operation; for example, from a mode of control operation to operate the bucket by shifting the control lever 1 in longitudinal directions to another mode of control operation to operate the arm by shifting the control lever 1 in the same directions. In such a case, the nut 4 is loosened to unfasten the bracket 3, the bracket 3 is turned through an angle of 90° in a desired direction, and then the bracket 3 is fastened again to the control lever 1 with the nut 4. This method of changing the setup of the control unit requires a troublesome work for loosening the nut 4 with a spanner to unfasten the bracket 3 and for tightening the nut 4 with a spanner to fasten the bracket 3 again to the control lever 1.

SUMMARY OF THE INVENTION

Accordinly, it is an object of the present invention to provide a control unit for a construction machine, having a structure capable of being simply and quickly changed from one setup to another setup suitable for a desired mode of control operation.

In one aspect of the present invention, a control unit for a construction machine comprises a control lever pivotally supported for movement in longitudinal and transverse directions, a first link rod for transmitting the operating force of the control lever to a first hydraulic control valve when the control lever is shifted in one of the longitudinal and transverse directions, and a second link rod for transmitting the operating force of the control lever to a second hydraulic control valve when the control lever is shifted in the other direction. A tubular operating force transmitting member is put on the control lever so as to be rotatable about the axis of the control lever, wherein the respective upper ends of the first and second link rods are joined pivotally to the operating force transmitting member respectively at positions spaced apart at an angular interval of 90° about the axis of the control lever, a locking member is put on the control lever above the operating force transmitting member so as to be able to move along the axis of the control lever to engage or to disengage from the operating force transmitting member and to be unable to turn relative to the control lever, and the engaging portions of the operating force transmitting member and the locking member have facets formed so that the operating force transmitting member can be restrained from turning relative to the control lever at two positions spaced apart at an angular interval of 90° about the axis of the control lever when the locking member engages the operating force transmitting member.

In changing the mode of control operation, the setup of the control unit is changed by the following procedure.

1. The locking member is moved along the control lever to disengage the locking member from the operating force transmitting member, so that the operating force transmitting member is able to turn about the axis of the control lever.

2. The operating force transmitting member is turned through an angle of 90° to change its position relative to the control lever.

3. The locking member is brough into engagement with the operating force transmitting member to lock the operating force transmitting member in the new position.

Thus, the setup of the control unit can simply and quickly be change to change the mode of control operation merely by axially shifting the locking member to lock the operating force transmitting member to the control lever and to release the same for free turning relative to the control lever.

BRIEF DESCRIPTION OF THE DRAWINGS

The above and other objects, features and advantages of the present invention will become more apparent from the following description taken in conjunction with the accompanying drawings, in which.

DETAILED DESCRIPTION OF THE PREFERRED EMBODIMENT

Figure 1:
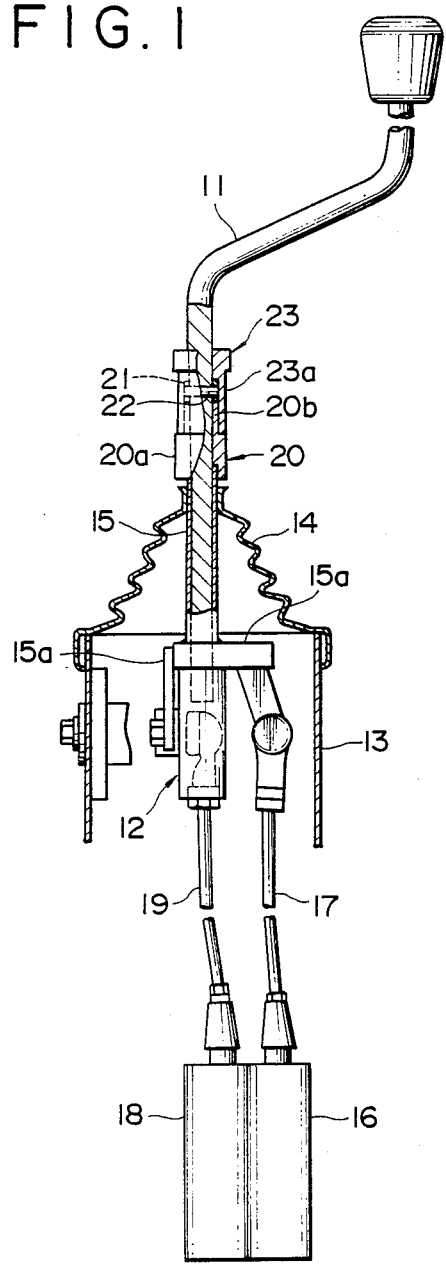
FIG. 1 is a partly sectional front elevation of a control unit in a preferred embodiment according to the present invention in a setup for one mode of control operation.

Referring to FIGS. 1 to 4, a control lever 11 is supported on a fixed lever stand 13 by a known universal coupling mechanism 12 for pivotal movement in longitudinal directions, namely, forward and backward directions, and in transverse directions, namely, rightward and leftward directions. The upper open end of the lever stand 13 is covered with a rubber dust cover 14.

A tubular operating force transmitting member (hereinafter referred to simply as "transmitting member") 15 is put on the lower end of the control lever 11 so as to be rotatable about the axis of the control lever 11. A link rod supporting part 15a is formed at the lower end of the transmitting member 15. The respective upper ends of a first link rod 17 for operating a first hydraulic control valve 16 and a second link rod 19 for operating a second hydraulic control valve 18 are joined to the link rod supporting part 15a respectively at positions separated from each other at an angular interval of 90° with respect to the circumferential direction. An operating force applied to the control lever 11 is transmitted through the transmitting member 15 to either the link rod 17 or 19 to operate either the hydraulic control valve 16 or 18 according to the direction of operation of the control lever 11.

When the control unit is in a setup as shown in FIG. 1, the first link rod 17 is pushed pulled up or pushed down to operate the first hydraulic control valve 16 when the control lever is shifted forward or backward, and the second link rod 19 is pushed down or pulled up to operate the second hydraulic control valve 18 when the control lever 11 is shifted rightward or leftward.

Figure 4:
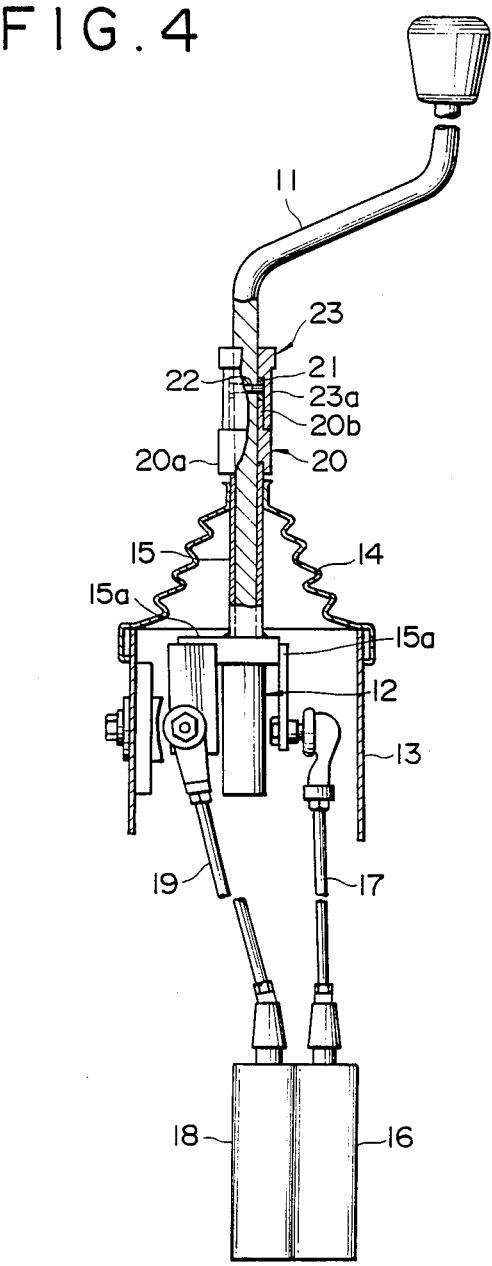
FIG. 4 is a partly sectional front elevation 1 of the control unit of FIG. 1 in another setup for another mode of control operation.
Figure 5:
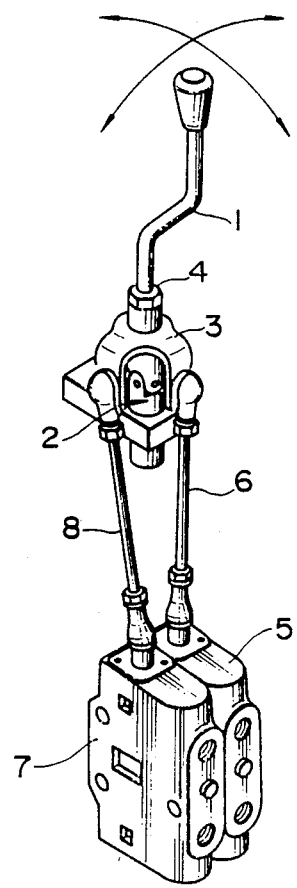
FIGS. 5 and 6 are perspective views showing a conventional control unit in different setups.
Figure 6:
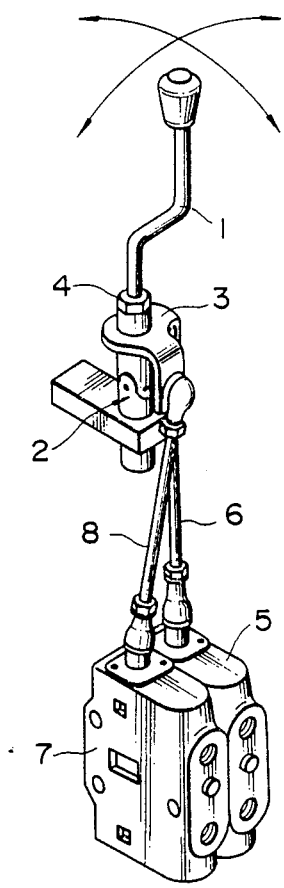

A setup of the control unit shown in FIG. 4 is set by turning the transmitting member 15 in a counterclockwise direction, as viewed in FIG. 1, through an angle of 90° about the axis of the control lever 11. In the setup shown in FIG. 4, the second hydraulic control valve 18 is operated by shifting the control lever 11 in longitudinal directions, and the first hydraulic control valve 16 is operated by shifting the control lever 11 in transverse directions.

A collar 20 is attached fixedly to the upper end of the transmitting member 15. A round grip portion 20a is formed in the lower half of the collar 20. The outer circumference of the grip portion 20a is knurled to ensure a firm grip. A square interlocking portion 20b is formed in the upper half of the collar 20. The transmitting member 15 can be turned about the axis of the control lever 11 by gripping the grip portion 20a of the collar 20.

An intermediate block 21 having the shape of a rectangular solid is put on the control lever 11 above the collar 20 and is fixed in place with a pin 22. The intermediate block 21 has a square cross section having the same size as that of square cross section of the interlocking portion 20b of the collar 20. A tubular interlocking member 23 is put on the control lever 11 axially slidably so as to extend over the intermediate block 21 and the interlocking portion 20b of the collar 20. A socket portion 23a having a square recess fitting the intermediate block 21 and the interlocking portion 20b of the collar 20 is formed in the lower half of the interlocking member 23. The intermediate block 21 and the interlocking portion 20b of the collar 20 are received in the square recess of the socket portion 23a of the interlocking member 23. A sealing member 24 is seated in an inner annular groove formed in the inner surface of the upper end of the interlocking member 23 to seal a gap between the control lever 11 and the interlocking member 23.

In a state where the interlocking portion 20b of the collar 20 and the intermediate block 21 are received in the square recess of the socket portion 32a of the interlocking member 23, the intermediate block 21, the interlocking member 23 and the collar 20 are unable to turn relative to the control lever 11, so that the transmitting member 15 is restrained from turning relative to the control lever 11.

Figure 2:
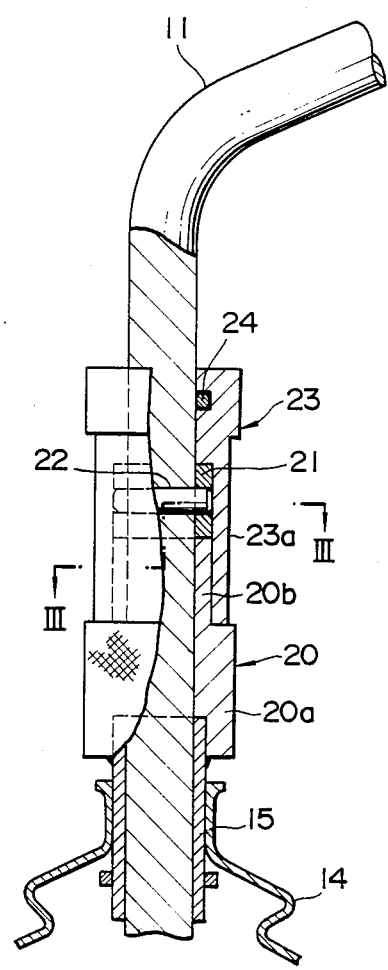
FIG. 2 is an enlarged fragmentary longitudinal sectional view of an essential portion of the control unit of FIG. 1.
Figure 3:
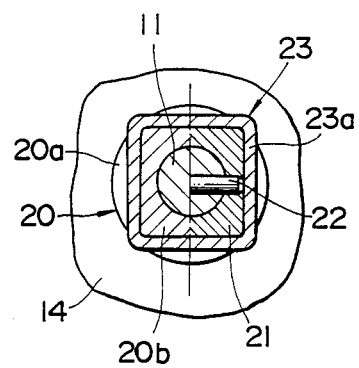
FIG. 3 is a sectional view taken on line III—III in FIG. 2.

In changing the setup shown in FIG. 1 for the setup shown in FIG. 4, the interlocking member 23 is shifted upward to separate its socket portion 23a from the interlocking portion 20b of the collar 20. Then, the collar 20, hence the transmitting member 15, is allowed to turn relative to the control lever 11. The transmitting member 15 is turned through an angle of 90° by gripping the collar 20 at the grip portion 20a to set the transmitting member 15 in a position shown in FIG. 4. Then, the interlocking member 23 is returned to its initial position as shown in FIG. 2 to restrain the transmitting member 15 from turning relative to the lever 11.

Although the interlocking portion 20b of the collar 20 is received in the socket portion 23a of the interlocking member 23 in this embodiment, the socket portion 23a of the interlocking member 23 may be received in the interlocking portion 20b of the collar 20. In the latter case, the external surface of the socket portion 23a and the internal surface of the interlocking portion 20b are formed in the substantially same square shapes in cross section.

Furthermore, since the surfaces forming the mating portions of the socket portion 23a and the interlocking portion 20b, essentially, are only to be formed so that the collar 20, hence the transmitting member 15, is restrained from turning relative to the interlocking member 23, hence the control lever 11, at two positions separated from each other at an angular interval of 90°, the control unit may be provided with, for example, a socket member having a female portion having two facets perpendicularly intersecting each other, and a plug member having a male portion having three facets formed at angular intervals of 90°.

From the foregoing description, it will be seen that the angular position of the transmitting member 15 relative to the control lever 11 and the hydraulic control valves 16 and 18 can readily be changed simply by disengaging the interlocking member 23 from the interlocking portion 20b of the collar 20 fixed to the transmitting member 15 simply by sliding the interlocking member 23 along the control lever 11, turning the transmitting member 15 and the collar 20 through an angle of 90° about the axis of the control lever 11, and engaging the interlocking member 23 again with the interlocking portion 20b of the collar 20. Thus, the operation for changing the setup of the control unit of the present invention can far more simply and quickly be achieved than changing the setup of the conventional control unit by unfastening the bracket from and fastening the same to the control lever by operating the nut.

Although the invention has been described in its preferred form with a certain degree of particularity, obviously many changes and variations are possible therein. It is therefore to be understood that the present invention may be practiced otherwise than as specifically described herein without departing from the spirit and scope thereof.

What is claimed is:

1. A control unit for a construction machine, comprising:
   a control lever pivotally supported for movement in longitudinal and transverse directions;
   a first link rod for transmitting the operating force of the control lever to a first hydraulic control valve when the control lever is shifted in one of the longitudinal and transverse directions; and
   a second link rod for transmitting the operating force of the control lever to a second hydraulic control valve when the control lever is shifted in the other direction;
   a tubular operating force transmitting member mounted on the control lever so as to be rotatable about the axis of the control lever, the respective upper ends of the first and second link rods being joined pivotally to the operating force transmitting member respectively at positions spaced apart at an angular interval of 90° about the axis of the control lever;
   a locking member mounted on the control lever above the operating force transmitting member so as to be able to move along the axis of the control lever to engage or to disengage from the operating force transmitting member,
   wherein the operating force transmitting member, the control lever and the locking member have engaging portions including facets formed so that the locking member restrains the operating force transmitting member from turning relative to the control lever at two positions spaced apart at an angular interval of 90° about the axis of the control lever when the locking member engages the facets of the operating force transmitting member and the control lever.

2. The control unit of claim 1 wherein said facets comprise:
   a rectangular section interlocking portion of said operating force transmitting member;
   a rectangular section block mounted on said control lever; and
   a rectangular section socket portion of said locking member fittable over said rectangular section interlocking portion and said rectangular section block.

* * * * *